United States Patent
Sato et al.

(10) Patent No.: US 6,687,947 B2
(45) Date of Patent: Feb. 10, 2004

(54) WIPER APPARATUS FOR MOTOR VEHICLE

(75) Inventors: Shingo Sato, Kiryu (JP); Tadashi Masuda, Tokyo (JP); Akira Hoshikawa, Tokyo (JP)

(73) Assignees: Mitsuba Corporation, Gunma (JP); Fuji Jukogyo Kabushiki Kaisha, Tokyo (JP)

( * ) Notice: Subject to any disclaimer, the term of this patent is extended or adjusted under 35 U.S.C. 154(b) by 49 days.

(21) Appl. No.: 10/166,864

(22) Filed: Jun. 11, 2002

(65) Prior Publication Data

US 2002/0184727 A1 Dec. 12, 2002

(30) Foreign Application Priority Data

Jun. 12, 2001 (JP) ......................................... 2001-176759

(51) Int. Cl.⁷ ............................... B60S 1/18; B60S 1/06
(52) U.S. Cl. ........................ 15/250.31; 15/250.3; 74/42; 74/43; 74/51; 248/214; 296/96.17; 403/388
(58) Field of Search ........................ 15/250.3, 250.31, 15/250.27, 250.14; 74/42, 43, 51; 248/200, 214, 544; 296/192, 96.17; 403/388

(56) References Cited

U.S. PATENT DOCUMENTS

| | | | | |
|---|---|---|---|---|
| 5,222,706 A | * | 6/1993 | Hoshino | 248/200 |
| 5,441,227 A | * | 8/1995 | Hayashi | 248/274.1 |
| 5,873,280 A | * | 2/1999 | Kanazawa | 74/42 |
| 6,101,664 A | * | 8/2000 | Egner-Walter et al. | 15/250.3 |
| 6,237,185 B1 | * | 5/2001 | Goto et al. | 15/250.31 |

FOREIGN PATENT DOCUMENTS

| | | |
|---|---|---|
| JP | 2000-38117 | 2/2000 |
| JP | 11278219 A | 10/2000 |

* cited by examiner

*Primary Examiner*—Gary K. Graham
(74) *Attorney, Agent, or Firm*—McCormick, Paulding & Huber LLP

(57) ABSTRACT

Reducing manufacturing costs and weight of the wiper apparatus for the motor vehicle. A pivot-side bracket having a pivot-side supporting surface is provided in a DR-side pivot holder, and a motor-side bracket having a motor-side supporting surface which forms a pair together with the pivot-side bracket is provided in a wiper motor, and the DR-side pivot holder and the wiper motor are fixed to a pipe by the same bolts and nuts.

4 Claims, 5 Drawing Sheets

WIPER APPARATUS FOR MOTOR VEHICLE

This application is entitled to the benefit of and incorporates by reference essential subject matter disclosed in Japanese Patent Application No. 2001-176759 filed on Jun. 12, 2001.

BACKGROUND OF THE INVENTION

The present invention relates to a wiper apparatus for a motor vehicle, and particularly to a structure effectively applied to a frame-integrally-formed type wiper apparatus for the motor vehicle, in which a plurality of pivot holders are connected by a frame member.

The wiper apparatus for the motor vehicle mainly wipes out surfaces of windshield glass substances adhered to such as rain, mist, snow, dirt splashed by other motor vehicles, thereby ensuring a visibility of drivers.

The wiper apparatus mentioned above has a wiper blade that is directly in contact with the glass surface, and a wiper arm to which the wiper blade is mounted. The wiper arm is fixed to a wiper shaft, so that the wiper blade makes a swing movement on the windshield glass surface and thereby performs a wiping operation when the wiper shaft makes a swing movement.

The wiper shaft is rotatably supported to a pivot holder fixed to a vehicle body, and a drive lever is provided at one end thereof. The drive lever is connected to a crank arm fixed to an output shaft of a wiper motor, so that the wiper shaft makes a swing movement when the wiper motor operates. Further, in the case of driving two wiper arms by one wiper motor, drive levers of respective wiper shafts are connected to each other by an interlocking member such as a linking rod or the like, and so each of the wiper shafts is interlocked.

In the wiper apparatus for the motor vehicle, which has two wiper arms, a pair of pivot holders are provided. However, in this case, there is a structure of a so-called frame-integrally-formed type in which these pivot holders are fixed to both ends of a pipe-shaped (cylindrical) frame.

In the frame-integrally-formed type wiper apparatus for the motor vehicle as mentioned above, the wiper motor is fixed onto the frame. For example, in the case of the invention disclosed in Japanese Patent Laid-Open No. 11-278219, with using two brackets, a frame supporting portion integrally provided in the wiper motor and a wiper frame cover which forms a pair together with the frame supporting portion, the wiper motor is fixed by bolts, nuts, and the like in a state of putting the frame between the brackets. Further, in the case of the invention disclosed in Japanese Patent Laid-Open No. 2000-38117, a bearing surface having a reverse C shaped sectional shape is formed in a part of a pipe-shaped frame by a press process (operation), and the wiper motor is directly fixed in the bearing surface by bolts, and nuts, and the like.

SUMMARY OF THE INVENTION

Respective pivot holders and a wiper motor are respectively fixed to a pipe-shaped frame by different fastening means in any cases. Further, brackets for fixing the wiper motor is required, or, even in the case where the brackets are not used, a press process is required, so that manufacturing costs of a wiper apparatus for a motor vehicle and weight thereof are increased.

An object of the present invention is to reduce the manufacturing costs and the weight of the wiper apparatus for the motor vehicle.

The wiper apparatus for the motor vehicle according to the present invention, comprising a first pivot holder rotatably supporting a first wiper shaft to which a first wiper arm is fixed; a second pivot holder rotatably supporting a second wiper shaft to which a second wiper arm is fixed; a frame member connecting said respective pivot holders to each other; and driving means fixed to said frame member for driving said respective wiper shafts, is characterized in that the wiper apparatus has a pivot-side bracket provided in one of said pivot holders, and a motor-side bracket provided in said driving means, and wherein said pivot-side bracket and said motor-side bracket are fixed to said frame member by the same fastening member in a state of putting said frame member therebetween.

The wiper apparatus for the motor vehicle according to the present invention is characterized in that said pivot-side bracket, said motor-side bracket and said frame member each have at least one mounting hole, and said fastening member is fastened in the state of being inserted into each of said at least one mounting hole.

The wiper apparatus for the motor vehicle according to the present invention is characterized in that said frame member is a pipe formed in a circle in section.

The wiper apparatus for the motor vehicle according to the present invention is characterized in that said pivot-side bracket has a pivot-side supporting surface which is in contact with an outer circumferential surface of said frame member in a predetermined range, and wherein said motor-side bracket has a motor-side supporting surface which is in contact with the outer circumferential surface of said frame member in the predetermined range.

According to the present invention, the pivot-side bracket is provided in one of the pivot holders, and the motor-side bracket is provided in the driving means, and the pivot-side bracket and the motor-side bracket are fixed to the frame member by the same fastening member. Therefore, one of the pivot holders and the driving means can be simultaneously fixed to each other, and the manufacturing costs and the weight of the wiper apparatus for the motor vehicle can be reduced.

DESCRIPTION OF THE PREFERRED EMBODIMENTS

Description will be in detail and below made of an embodiment of the present invention with reference to the accompanying drawings.

Figure 1:
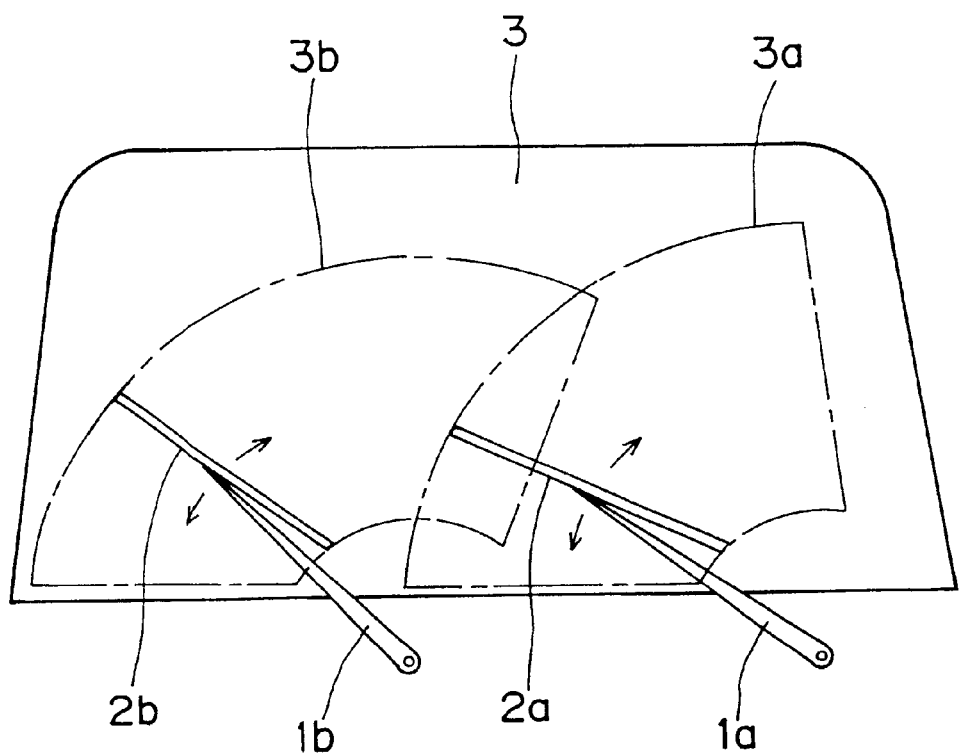
FIG. 1 is a schematic view showing an outline of a wiper apparatus for a motor vehicle according to an embodiment of the present invention.
Figure 2:
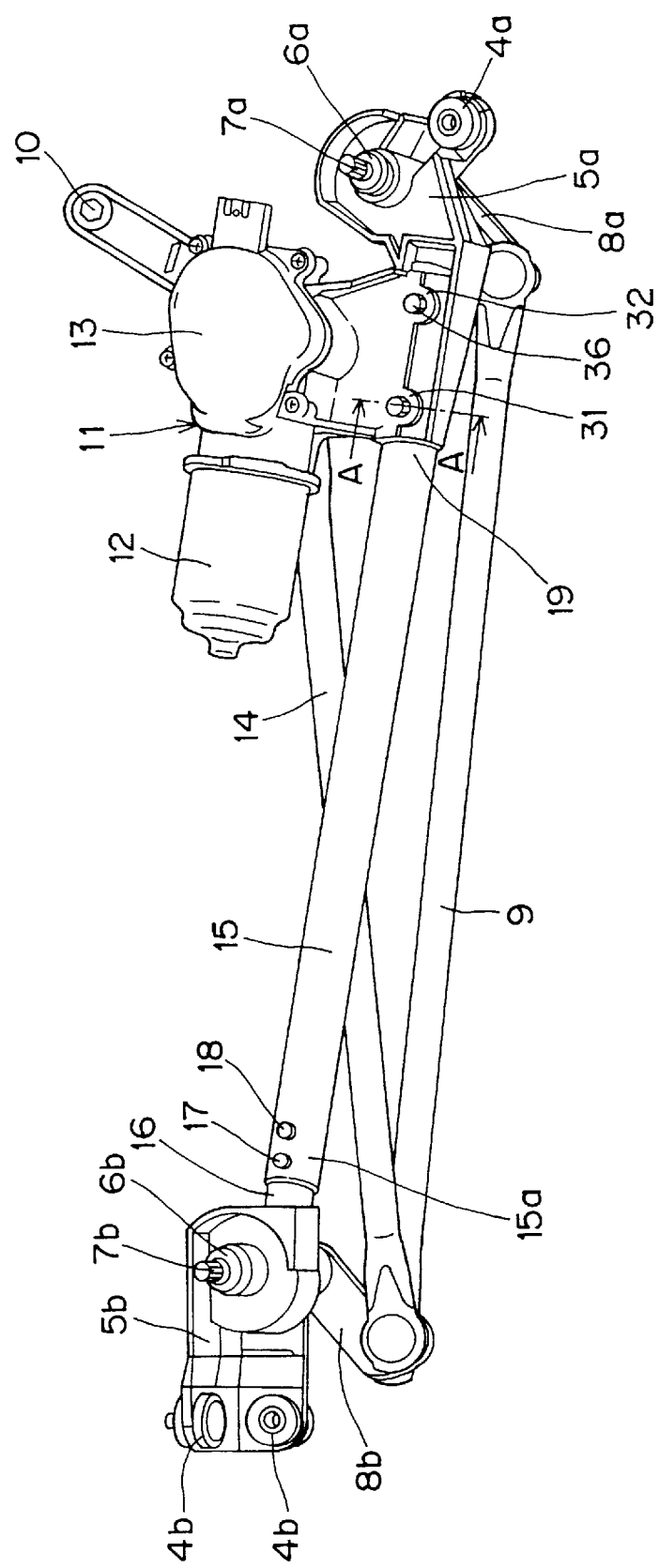
FIG. 2 is a perspective view showing the details of the wiper apparatus as shown in FIG. 1.

FIG. 1 is a schematic view showing an outline of a wiper apparatus for a motor vehicle according to an embodiment of the present invention, and FIG. 2 is a perspective view showing the details of the wiper apparatus as shown in FIG. 1.

The wiper apparatus has a driver-seat-side wiper arm used as a first wiper arm, that is, a DR-side wiper arm 1a, and a passenger-side wiper arm used as a second wiper arm, that is, an AS-side wiper arm 1b. A DR-side wiper blade 2a is mounted to the DR-side wiper arm 1a, and an AS-side wiper blade 2b is mounted to the AS-side wiper arm 1b. Each of the wiper blades 2a and 2b is in contact with a front (windshield) glass 3 by a spring member (not shown) or the like provided inside each wiper arm, in such a manner as to be elastically pressed.

These wiper blades 2a and 2b make swing movements in the same direction within respective wiping ranges 3a and 3b between upper inverting positions in an upper side of the front glass 3 and lower inverting positions located at a lower end of the front glass 3. That is, a wiping pattern of the wiper apparatus for the motor vehicle is set to a tandem type.

As shown in FIG. 2, at a vehicle body (not shown) are mounted a driver-seat-side pivot holder, a DR-side pivot holder 5a which is used as a first pivot holder fixed by a mounting portion 4a, and a passenger-side pivot holder, that is, an AS-side pivot holder 5b which is used as a second pivot holder fixed by a mounting portion 4b.

A driver-side wiper shaft, that is, a DR-side wiper shaft 6a used as a first wiper shaft is rotatably supported to the DR-side pivot holder 5a, and a root portion of the wiper arm 1a is fixed to a spline 7a provided in one end of the DR-side wiper shaft 6a. Similarly, a passenger-side wiper shaft, that is, an AS-side wiper shaft 6b used as a second wiper shaft is rotatably supported to the AS-side pivot holder 5b, and the root portion of the wiper arm 1b is fixed to a spline 7b provided in one end of the AS-side wiper shaft 6b.

Further, a drive lever 8a having a predetermined levering ratio is fixed to the DR-side wiper shaft 6a, so that the DR-side wiper shaft 6a is integrally operated with the drive lever 8a. Similarly to this, a drive lever 8b having the predetermined levering ratio is fixed to the AS-side wiper shaft 6b, so that the AS-side wiper shaft 6b is integrally operated with the drive lever 8b. A linking rod 9 is pin-connected to each of the drive levers 8a and 8b, and thereby the drive levers 8a and 8b are in a state of being linked to each other. Therefore, when one of the wiper shafts makes a swing movement, this swing movement is transmitted to the other of the wiper shafts via the linking rod 9.

Further, a wiper motor 11 used as a drive source is fixed to a mounting portion 10 in the vehicle body, and the wiper motor 11 is constituted by a motor body 12 and a reduction gear 13. The motor body 12 is a so-called electric motor which is operated by an electric current supplied from a battery (not shown), and an output thereof is input to the reduction gear. The reduction gear 13 reduces a rotational speed of the motor body 12 up to the predetermined rotational number and is output, and a crank arm (not shown) is fixed to an output shaft of this reduction gear 13.

One end of a drive connecting rod 14 is pin-connected to the crank arm, so that when the wiper motor 11 operates and the crank arm rotates, the drive connecting rod 14 reciprocates. Further, the other end of the drive connecting rod 14 is pin-connected to the drive lever 8b, so that the reciprocation of the drive connecting rod 14 is converted into the swing movement of the drive lever 8b. Accordingly, when the wiper motor 11 is rotated, this rotating motion is converted into each swing movement of the wiper shafts 6a and 6b and thereby the wiping operation of the wiper apparatus for the motor vehicle is executed.

The DR-side pivot holder 5a, the AS-side pivot holder 5b and the wiper motor 11 are connected by a frame member so as to be formed as one unit, in order to improve each mounting rigidity thereof and keep respective positional relations fixed. This frame member is a pipe 15 formed in a circle in section, and is formed so as to keep the length between the respective pivot holders 5a and 5b at a predetermined interval. Note that, in the present embodiment, the frame member is the pipe 15 formed in a circle in section, but is not limited to this, and may employ a hollow member or a solid member or the like having another shape in section, or employ any shapes that can connect the respective pivot holders to each other.

Figure 3:
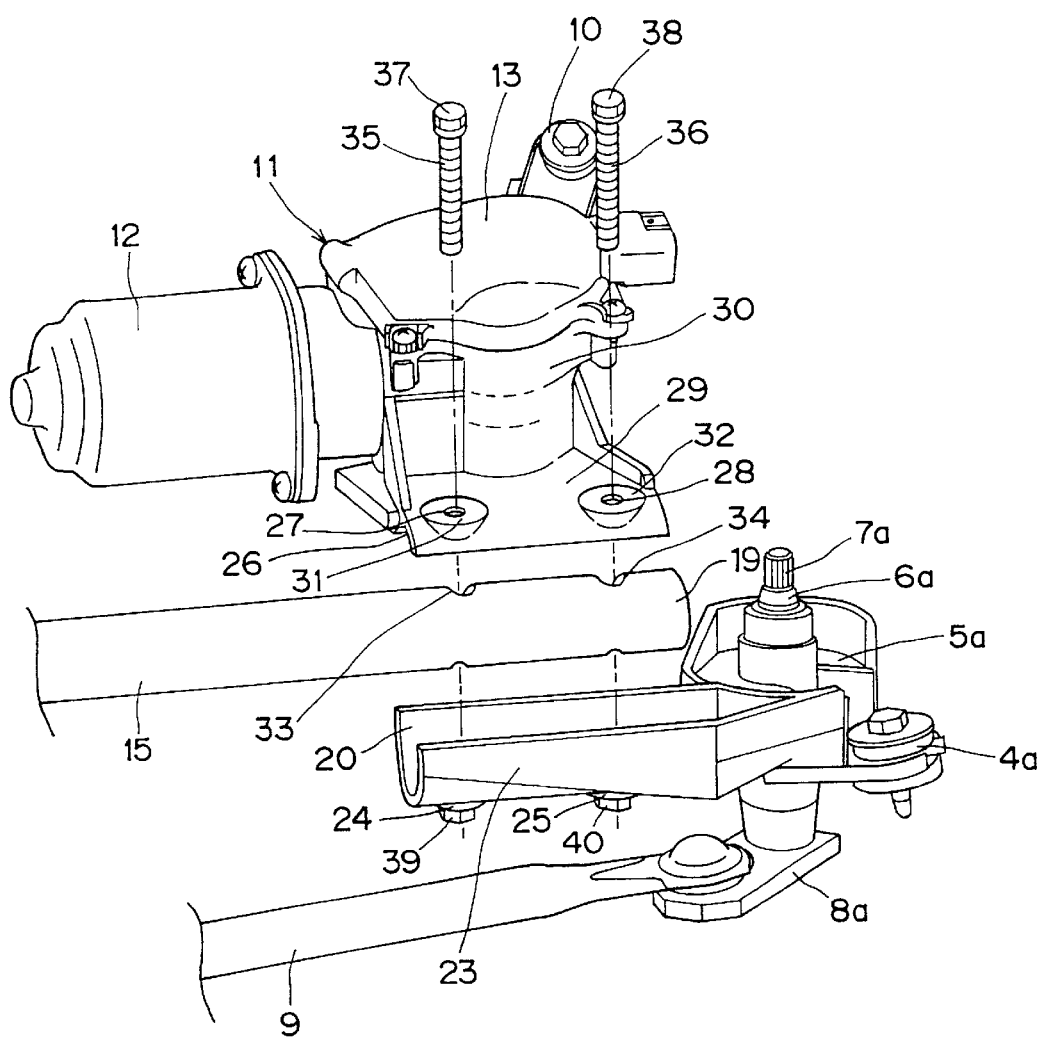
FIG. 3 is an exploded perspective view showing the mounting structure between a DR-side (diver-side) pivot holder and a wiper motor of the wiper apparatus as shown in FIG. 2.
Figure 4:
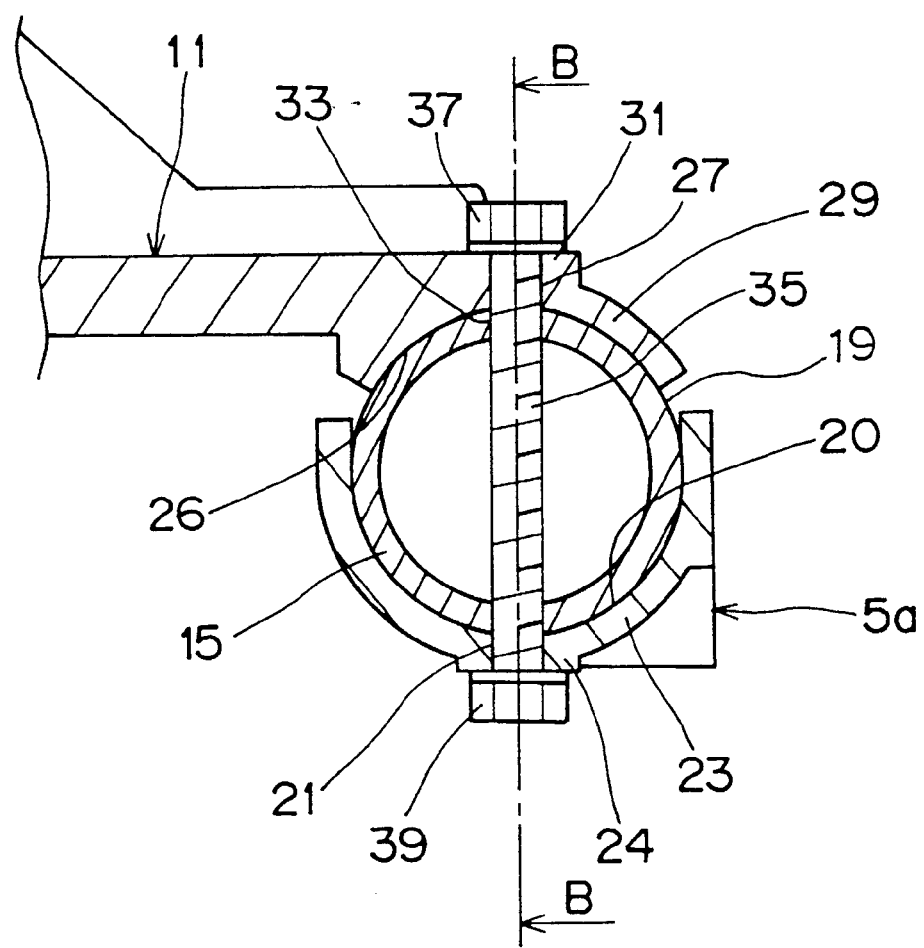
FIG. 4 is a cross-sectional view taken along line A—A in the wiper apparatus as shown in FIG. 2.
Figure 5:
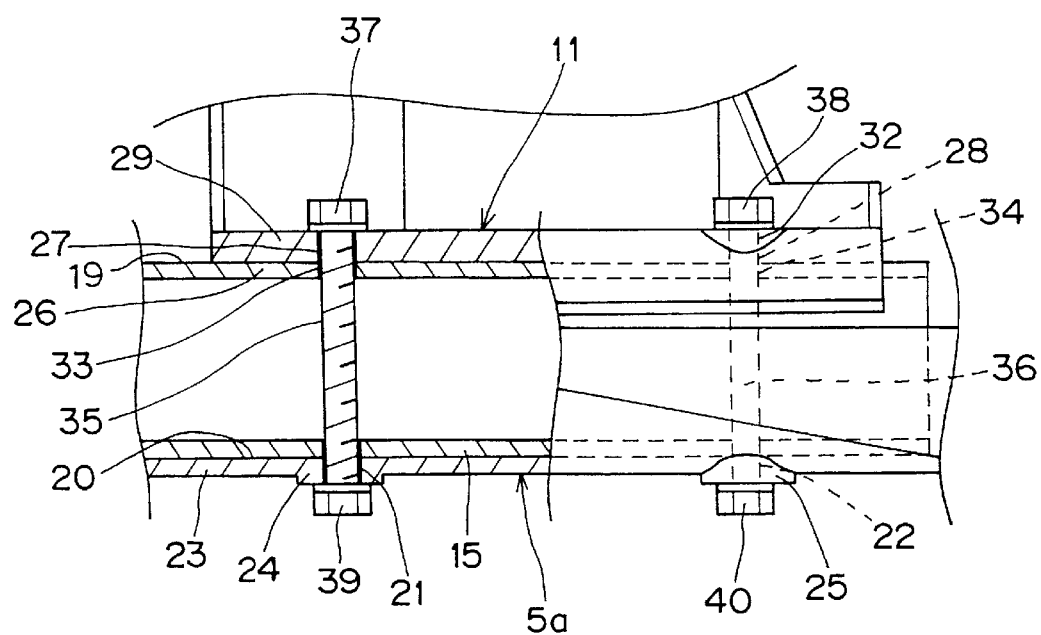
FIG. 5 is a cross-sectional view taken along line B—B in the cross-sectional view shown in FIG. 4.

FIG. 3 is an exploded perspective view showing a mounting structure between the DR-side pivot holder and the wiper motor in the wiper apparatus for the motor vehicle as shown in FIG. 2; and FIG. 4 is a cross-sectional view taken along line A—A of the wiper apparatus as shown in FIG. 2; and FIG. 5 is a cross-sectional view taken along line B—B of the cross-sectional view shown in FIG. 4.

A connection boss 16 formed in a circular section is integrally provided in the AS-side pivot holder 5b, and a fitting portion 15a corresponding to one end of the pipe 15 is fitted to this connection boss 16. The fitting portion 15a and the connection boss 16 are provided with two mounting holes (not shown) that are formed and arranged so as to pass through both of the fitting portion and the connection boss along an axial direction thereof, and the AS-side pivot holder 5b and the pipe 15 are fixed by respective rivets 17 and 18 to be inserted into the mounting holes.

The DR-side pivot holder 5a is provided with a pivot-side supporting surface 20 contacting therewith in a predetermined range of an outer circumferential surface 19 of the pipe 15, that is, a range of about half of an outer circumferential distance of the pipe 15 as shown in FIG. 4; and a pivot-side bracket 23 having two mounting holes 21 and 22 which are each formed at a substantially central point in a circumferential direction of this pivot-side supporting surface 20 and which are arranged along an axial direction. Further, bolt bearing surfaces 24 and 25 are formed in a surface opposite to the pivot-side supporting surface 20 of the pivot-side bracket 23 so as to be located in the peripheries of opening ends of the mounting holes 21 and 22, respectively.

Further, the wiper motor 11 is provided with a motor-side supporting surface 26 contacting therewith in the predetermined range of the outer circumferential surface 19 of the pipe 15, that is, a range of about one third of the outer circumferential distance of the pipe as shown in FIG. 4; and a motor-side bracket 29 having two mounting holes 27 and 28 which are each formed at a substantially central point in a circumferential direction of the motor-side supporting surface 26 and which are arranged along an axial direction thereof. The motor-side bracket 29 is integrally formed with a housing 30 of the reduction gear 13, and bolt bearing surfaces 31 and 32 are formed in a surface opposite to the motor-side supporting surface 26 of the motor-side bracket 29 so as to be located in the peripheries of opening ends of the mounting holes 27 and 28, respectively. Note that, in the present embodiment, the pivot-side supporting surface 20 and the motor-side supporting surface 26 are in contact with the outer circumferential surface 19 of the pipe 15 in the respective predetermined ranges, but the contact therebetween is not limited to these ranges, and the contact surfaces between each of both supporting surfaces and the outer circumferential surface of the pipe may be other shape surfaces.

The mounting holes 21 and 22 provided in the pivot-side bracket 23 have the same diameter as the mounting holes 27 and 28 provided in the motor-side bracket 29, and the interval between the holes 21 and 22 is equal to the interval between the holes 27 and 28 relative to an axial direction. Further, mounting holes 33 and 34 having the same diameter and the same interval as those of the above-mentioned mounting holes are provided in the pipe 15.

Further, as shown in FIG. 3, the pivot-side bracket 23 and the motor-side bracket 29 are arranged for the pipe 15 to be interposed putting therebetween. At this time, as shown in FIGS. 4 and 5, the mounting holes provided in the respective members are located so as to be coaxial with one anther.

In this state, bolts 35 and 36 each used as a fastening member are inserted into the respective mounting holes from a side of the motor-side bracket 29. In this condition, head portions 37 and 38 of the bolts 35 and 36 are located at the bolt bearing surfaces 31 and 32 of the motor-side bracket 29. The pivot-side bracket 23 and the motor-side bracket 29 are fixed to the pipe 15 by the same bolts 35 and 36 and nuts 39 and 40, with fixing, on the bolt bearing surfaces 24 and 25 provided in the pivot-side bracket 23, the nuts 39 and 40 each used as a fastening member. Accordingly, the DR-side pivot holder 5a and the wiper motor 11 are fixed to the pipe 15. Note that, in the present embodiment, the bolts 35 and 36 and the nuts 39 and 40 are used as fastening members, but this embodiment is not limited to this and may use other fastening members such as rivets or the like. Further, in place of the nuts 39 and 40, any one of the mounting holes 21 and 22 of the pivot-side bracket 23 and the mounting holes 27 and 28 of the motor-side bracket 29 may be formed as a screw hole having a female type screw.

By having the structure mentioned above, since the DR-side pivot holder 5a and the wiper motor 11 can be simultaneously fixed by the same bolts 35 and 36 and nuts 39 and 40, it is possible to reduce the number of steps (processes) of manufacturing the wiper apparatus for the motor vehicle.

Further, since the pivot-side bracket 23 and the motor-side bracket 29 form a pair, it is unnecessary to independently provide another bracket that forms a pair together with the motor-side bracket 29. Therefore, it is possible to reduce the number of parts to be used in the wiper apparatus and reduce manufacturing costs and weight thereof.

Additionally, since the pivot-side bracket 23 and the motor-side bracket 29 contact with the pipe 15 within the respective predetermined ranges, stresses applied to the fastened portions therebetween are dispersed. Therefore, there is no risk or fear that the respective fastened portions of the bolts 35 and 36 and the nuts 39 and 40 are loosened or the like.

The present invention is not limited to the embodiment mentioned above, and the present invention can be variously modified and changed without departing from the purpose thereof. For example, in the present embodiment, two sets of the wiper blades, the wiper arms and the wiper shafts are, respectively, provided, but the number of sets thereof is not limited to this and may be three or more. In this case, an added wiper shaft is supported by a second pivot holder that will be newly provided.

According to the present invention, the pivot-side bracket is provided in one of the pivot holders, and the motor-side bracket which forms a pair together with the pivot-side bracket is provided in the driving means, and one of the pivot holders and the driving means are fixed to the frame member by the same fastening members. Therefore, one of the pivot holders and the driving means can be simultaneously fixed, and so the number of steps of manufacturing the wiper apparatus can be reduced.

Further, since the pivot-side bracket and the motor-side bracket interpose the frame member therebetween after being fastened, it is unnecessary to independently provide another bracket that forms a pair together with the motor-side bracket. Therefore, it is possible to reduce the number of parts used in the wiper apparatus and reduce manufacturing costs and weight thereof.

Further, since the pivot-side bracket and the motor-side bracket contact with the frame member therewith within the respective predetermined ranges, the stresses applied to the fastened portions therebetween are dispersed and there is no risk or fear that the fastening members are loosened.

Having described the preferred embodiments of the invention referring to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A wiper apparatus for a motor vehicle, comprising:
    a first pivot holder rotatably supporting a first wiper shaft to which a first wiper arm is fixed;
    a second pivot holder rotatably supporting a second wiper shaft to which a second wiper arm is fixed;
    a frame member connecting said respective pivot holders to each other; and
    driving means fixed to said frame member for driving said respective wiper shafts,
    wherein the wiper apparatus has a pivot-side bracket provided in one of said pivot holders, and a motor-side bracket provided in said driving means, and wherein said pivot-side bracket and said motor-side bracket are fixed to said frame member by the same fastening member for interposing said frame member therebetween.

2. The wiper apparatus according to claim 1, wherein said pivot-side bracket, said motor-side bracket and said frame member each have at least one mounting hole, and said fastening member is fastened in a state of being inserted into each of said at least one mounting hole.

3. The wiper apparatus according to claim 1, wherein said frame member is a pipe with a circular sectional shape.

4. The wiper apparatus according to claim 1, wherein said pivot-side bracket has a pivot-side supporting surface contacting an outer circumferential surface of said frame member in a predetermined range, and wherein said motor-side bracket has a motor-side supporting surface contacting an outer circumferential surface of said frame member in a predetermined range.

* * * * *